Figure 1:
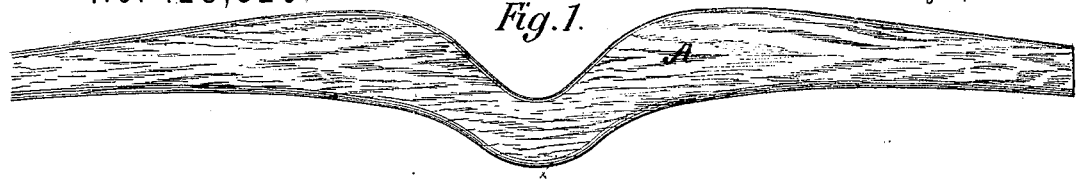
Figure 2:
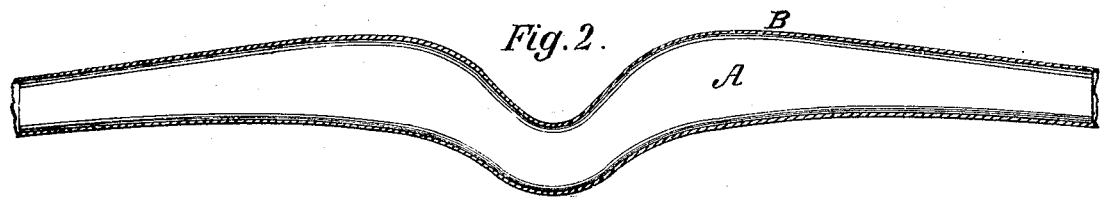
Figure 3:
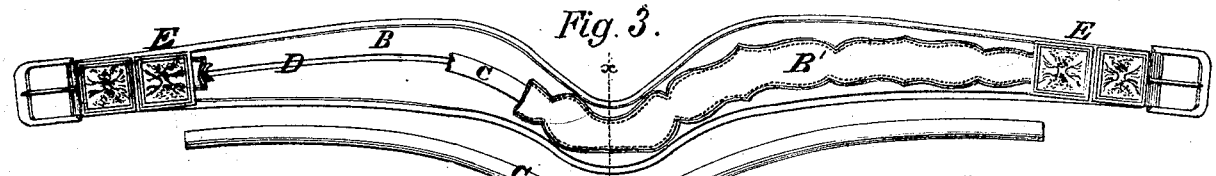
Figures 4, 5:
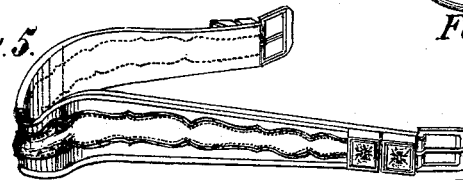
Figure 6:
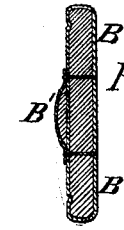
Figure 7:
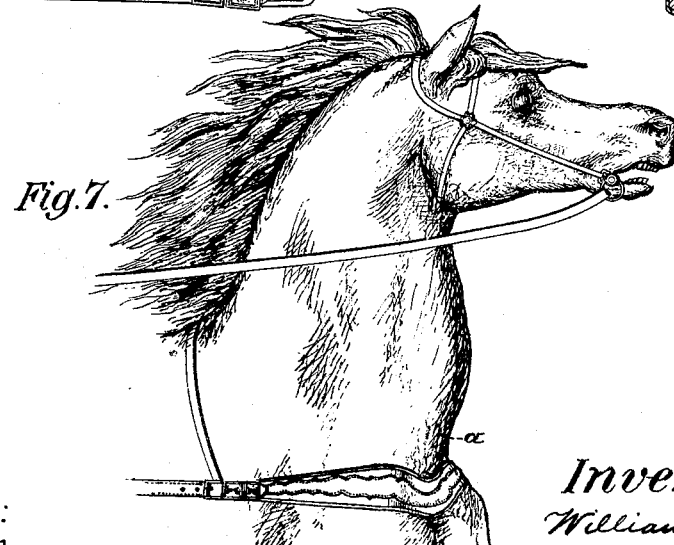

W. T. ALBRO.

Breast-Collars for Horses.

No. 128,520.    Patented July 2, 1872.

Witnesses:
Herm Lauten
Fred. Arto's

Inventor:
William T. Albro
Chipman Hosmer & Co
Attys 128,520

UNITED STATES PATENT OFFICE.

WILLIAM T. ALBRO, OF ELLISBURG, NEW YORK.

IMPROVEMENT IN BREAST-COLLARS FOR HORSES.

Specification forming part of Letters Patent No. 128,520, dated July 2, 1872.

I, WILLIAM T. ALBRO, of Ellisburg, Jefferson county, State of New York, have invented certain Improvements in Breast-Collars and Method of Manufacturing them, of which the following is a specification:

Nature and Object of the Invention.

My invention relates to an improvement in that kind of harness in which a breast-collar is used instead of the common neck-collar; and consists in the novel construction of a former or crimping-bar, as hereinafter described, upon which the leathern portion of the collar is molded. It also consists in the novel construction of a metallic tree, as described, adapted for use in conjunction with the leathern covering above mentioned.

In the drawing, the letter A designates the crimp or former on which the leathern portion of my collar is first molded to give it the shape or form desired. This crimp or former is made of any suitable material, and with the depression $a'$ and corresponding elevation $b$, tapering toward the ends $c$, as shown. This forms in the collar an arch which comes directly over the wind-pipe, thereby preventing choking and aiding respiration; also renders it cooler and more comfortable in hot weather. After the leathern portion of my collar is molded into the required form or shape, I remove the crimp A and replace it by a metallic rod or tree. This tree is marked C on the drawing, and is of sufficient length to extend across the horse's breast to the points of the shoulders, and is bent in the proper circle for adaptation thereto.

A collar formed on this crimp and constructed in the manner described will retain its shape for a great length of time, and can be cheaply manufactured.

Having thus described my invention, what I claim as new, and desire to secure by Letters Patent, is—

1. A breast-collar for horses, having the metallic tree C made in the form and manner substantially as described.

2. A horse-collar, the exterior portion of which is crimped upon a former, substantially as described.

WILLIAM T. ALBRO.

Witnesses:
 F. E. METCALF,
 DANIEL STILWELL.